United States Patent [19]

Simon

[11] Patent Number: 5,675,128
[45] Date of Patent: Oct. 7, 1997

[54] CABLE TERMINAL

[76] Inventor: Hans Simon, Freier Erfinder, Bruchhausenerstr. 13, D-53572, Unkel/Rhein, Germany

[21] Appl. No.: 664,027

[22] Filed: May 24, 1996

Related U.S. Application Data

[63] Continuation of Ser. No. 326,383, Oct. 20, 1994, abandoned.

[51] Int. Cl.⁶ ................................................. H01B 17/26
[52] U.S. Cl. ............... 174/152 G; 174/135; 174/153 G; 174/156; 248/56
[58] Field of Search ........................ 174/156, 135, 174/152 G, 153 G, 153 R, 155, 65 G; 248/56, 74.3; 439/464, 467, 471

[56] References Cited

U.S. PATENT DOCUMENTS

| | | | |
|---|---|---|---|
| 3,424,856 | 1/1969 | Coldren | 174/153 G |
| 4,002,822 | 1/1977 | Kurosaki | 174/153 G |
| 4,077,085 | 3/1978 | Yuda | 174/153 G |
| 4,611,868 | 9/1986 | Matsui et al. | 174/135 X |
| 4,669,688 | 6/1987 | Itoh et al. | 248/74.3 X |
| 4,981,444 | 1/1991 | Willmott | 174/153 G |
| 5,230,489 | 7/1993 | White et al. | 248/74.2 |
| 5,243,139 | 9/1993 | Law | 174/153 G |

*Primary Examiner*—Kristine L. Kincaid
*Assistant Examiner*—Paramita Ghosh
*Attorney, Agent, or Firm*—Joseph Zallen, Esq.

[57] ABSTRACT

An improvement for a cable terminal which includes a terminal carrier 1 and a terminal clamp 12 tracked in the carrier where a flexible locking tooth 8 on the terminal carrier 1 works in conjunction with a toothed rack 24 on the terminal clamp 12. In this improvement the terminal carrier 1 is in the form of a hollow cylinder or cuboid whose upper edge includes two opposed grooves 2, 3 to accommodate a cable, and the terminal clamp 12 includes a clamping rib 19, 20, 19a, 20a which acts on the cable from above and/or laterally, centrally to the grooves, and which can be axially displaced and locked.

5 Claims, 3 Drawing Sheets

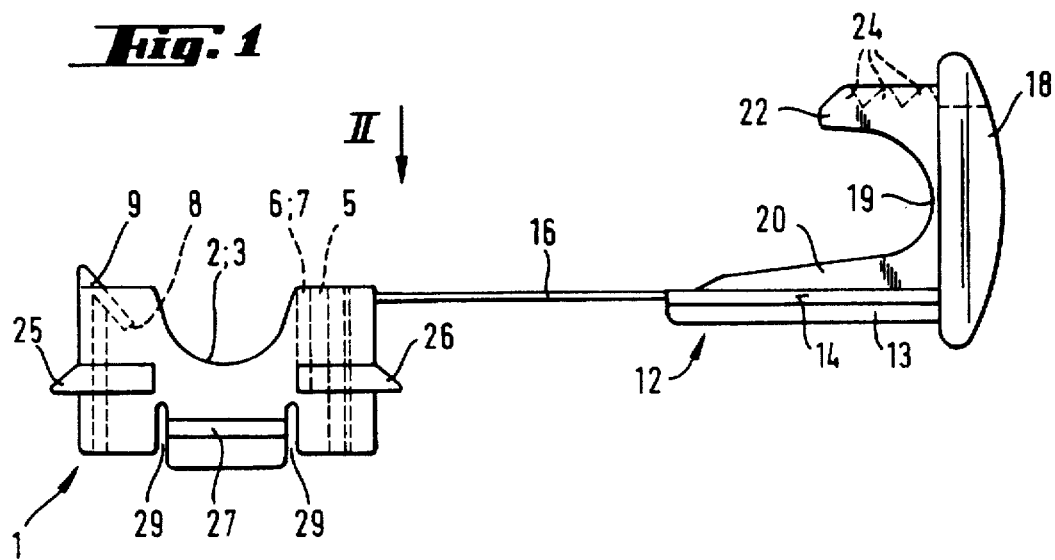
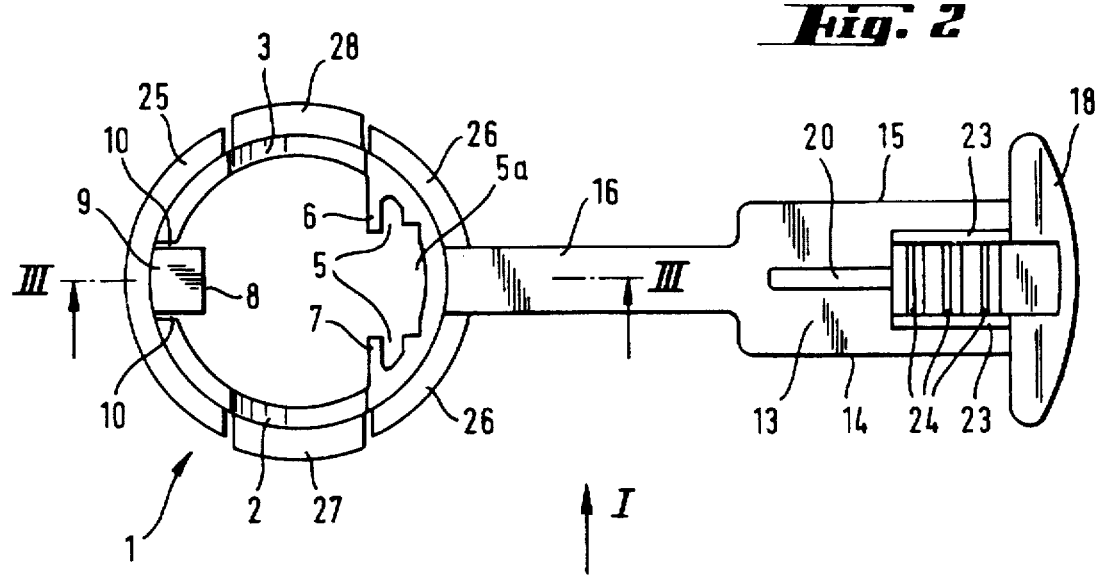

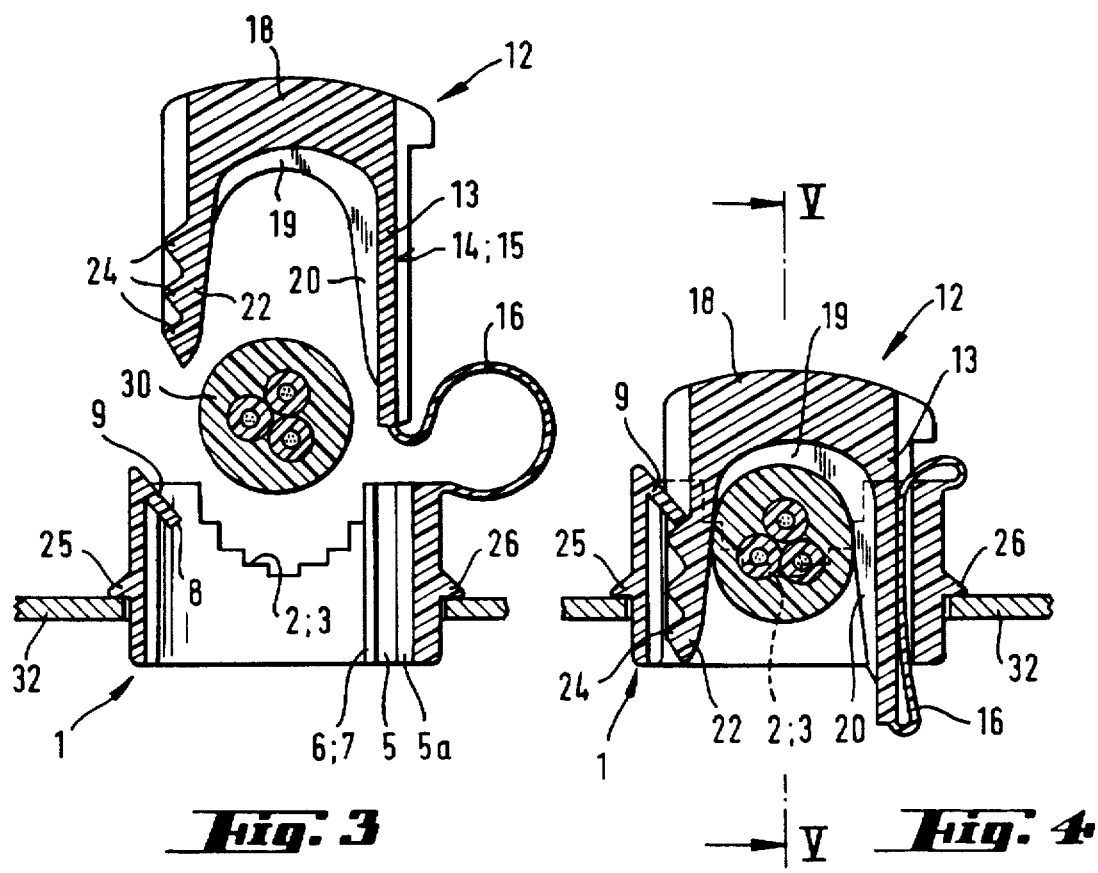
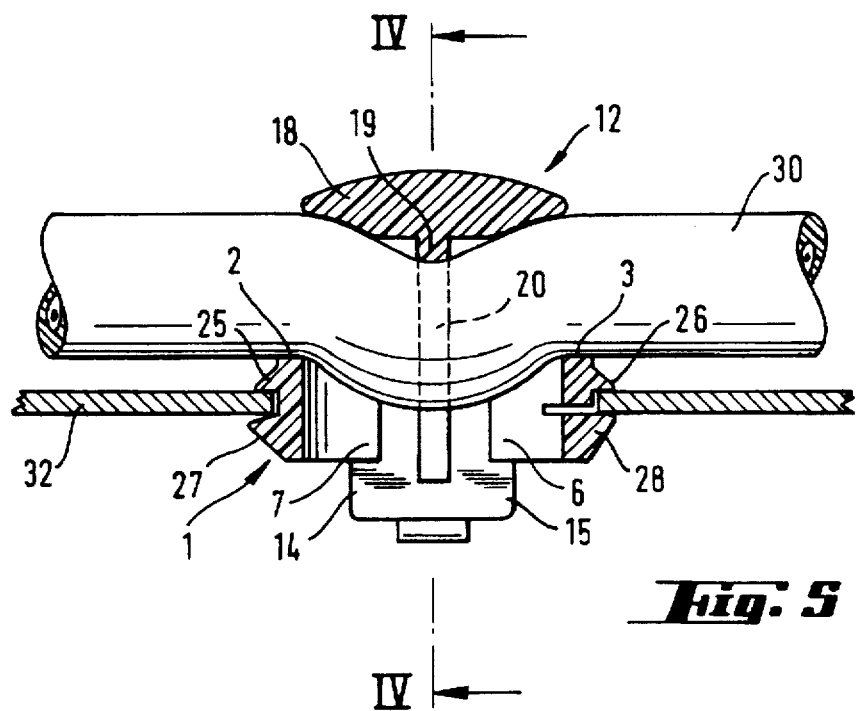

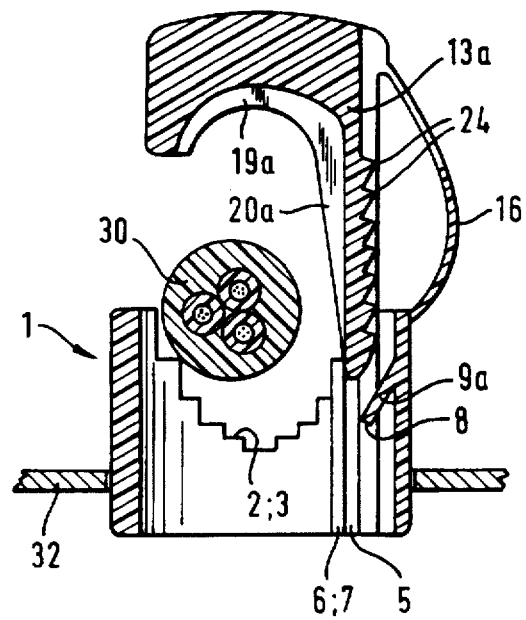
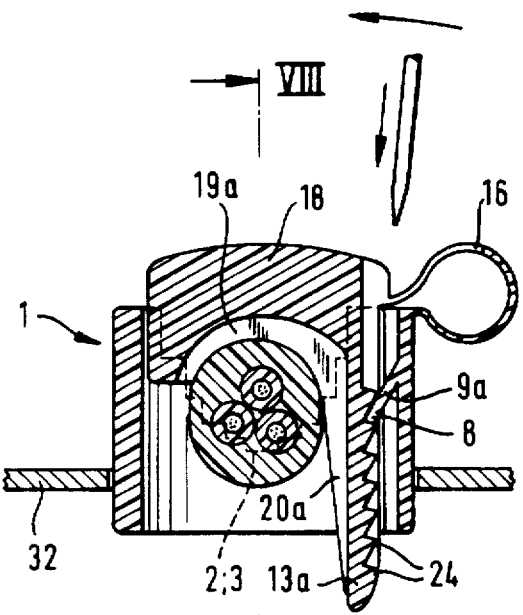
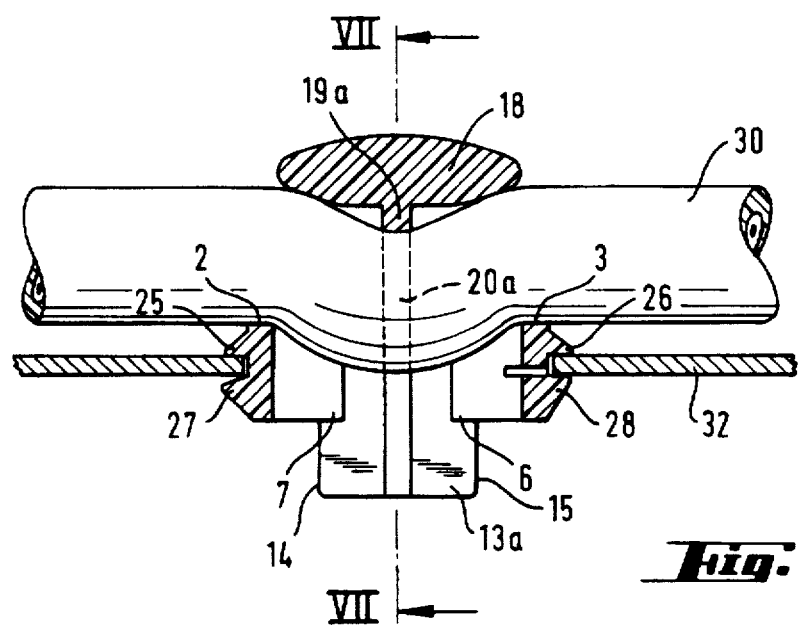

CABLE TERMINAL

This is a continuation of patent application Ser. No. 08/326,383 filed Oct. 20, 1994 by the applicant, which application is now abandoned.

BACKGROUND OF INVENTION

The present invention relates to a cable terminal comprising a terminal carrier and a terminal clamp tracked in the carrier wherein a flexible locking tooth on the terminal carrier works in conjunction with a toothed rack on the terminal clamp.

In the cable terminal described in German Patent 26 26 412, the terminal carrier and the terminal clamp each have a relatively large contact area between which the cable can be clamped. The disadvantage of such cable terminals is that they do not secure the cable sufficiently against axial displacement (insufficient strain relief). Rather there is the danger that the cable will be pulled through longitudinally between the clamping surfaces. Although one possible solution would be to increase the clamping force, such an increased clamping force acting from above against the terminal clamp could be applied manually only with difficulty. Furthermore a correspondingly large toothed area on the locking tooth and toothed rack would also be necessary to transmit an increased clamping force. However, this would yield a relatively large pitch between the teeth on the toothed rack, with the result practically always that only one cable with the appropriate thickness fit could be clamped. Moreover it is somewhat difficult to re-open the cable terminal where such large forces are applied.

One object of the present invention is to provide a cable terminal wherein a large clamping area is achieved with a relatively small force, and cables of varying thickness can be clamped with strain relief to use an injection moulding process such that said cable terminal is as light and cheap as possible.

A further object of this invention is to provide such cable terminals which can be made by injection moulding.

Further objects and advantages of this invention will be apparent from the specification and claims which follow taken together with the appended drawings.

BRIEF SUMMARY OF INVENTION

In the cable terminal of this invention the terminal carrier is in the form of a hollow cylinder or cuboid whose upper edge comprises two opposed grooves to accommodate a cable, while the terminal clamp comprises a clamping rib which acts on the cable from above and/or laterally, centrally to the grooves, and which can be axially displaced and locked.

In a cable terminal in accordance with the invention the cable is not clamped between two clamping surfaces which are diametrically opposed relative to the cable but rather one clamping rib in the terminal clamp is centrally opposed to two clamping ribs in the terminal carrier. In view of their relatively small contact edge areas, these clamping ribs press into the plastic material of the cable sheath even with a relatively small clamping force. A principal feature is that the cable is bent between the grooves or clamping ribs in the terminal carrier by the clamping rib of the terminal clamp. Longitudinal displacement of a cable relative to the cable terminal is practically impossible where said cable is bent or curved in snake-like fashion between the three ribs—and thus an optimum strain-relief system is provided.

As a result of the cable flexibility, a comparatively large degree of travel by the terminal clamp relative to the terminal carrier is achieved, i.e. a large clamping area. Consequently the pitch between the individual teeth in the terminal clamp toothed rack can be correspondingly large. Thus a relatively small degree of compression between the contacting toothed surfaces is achieved. Because of the ease of displacement of the terminal clamp relative to the terminal carrier and this small contact pressure on the tooth flanks, the locking tooth can be relatively easily disengaged. It is, therefore, a relatively simple matter to close this cable terminal without a tool and to open it with a tool.

It is particularly surprising that these advantages are achieved with a significant simplification in the shape in that the bed for the cable is provided by the upper edge of the hollow cylindrical terminal carrier.

A special embodiment of the invention is characterized therein that a lateral area of the clamping rib in the terminal clamp tapers off downwards (in the direction of insertion) (see claim 2).

The clamping rib, or more accurately the rear of the clamping rib in contact with the cable, is thus inclined relative to the tracked section, i.e. relative to the direction of insertion, of the terminal clamp. When the terminal clamp is inserted into the terminal carrier, the cable is bent at right angles to this inclined clamping rib between the two relevant clamping ribs in the terminal carrier. Bending occurs therefore not, or not exclusively, from above, i.e. in the direction of insertion, but at an inclined angle to the direction of insertion. In this way the distance by which the cable is inserted is increased, corresponding to the angle to the direction of insertion.

Thanks to this large distance, a plurality of locking teeth can be provided on the toothed rack, each with a sufficiently large toothed area.

Since, according to the invention, strain relief is mainly achieved by cable deformation for which only a relatively minor force is required the clamping ribs which contact the cable are not pressed strongly or deeply into the cable sheath, thereby protecting the cable sheath while also making tool-free actuation feasible.

A wide variety of embodiments of the cable terminal in accordance with the invention is possible. In particular the toothed rack can be provided on a shoulder located opposite the tracked arm of the terminal clamp (see claim 3). In this case, therefore, the terminal clamp has one longer arm which is tracked in the terminal carrier's track, while the other arm is provided with the locking teeth and can be shorter, depending on the number of teeth provided or the planned insertion length. The toothed rack can, however, also be provided on the tracked arm (see claim 4).

To explain the invention in greater detail, two embodiments are described below in conjunction with the drawings where the features of the subordinate claims are also individually described in detail.

BRIEF DESCRIPTION OF DRAWINGS

A first embodiment is described with reference to FIGS. 1 to 5 in which:

FIG. 1 shows a side view when open;

FIG. 2 shows a plan view as per 11—11 of FIG. 1;

FIG. 3 shows the cable terminal in accordance with FIGS. 1 and 2 prior to connection in a cross-section at right angles to the cable, as per line 111—111 of FIG. 2;

FIG. 4 shows the same view after connection, i.e. with a clamped cable;

FIG. 5 is a section longitudinally through the cable as per line V—V of FIG. 4.

A second embodiment is shown analogously in FIGS. 6 to in which namely:

FIG. 6 shows a section at right angles to the cable, prior to connection;

FIG. 7 shows the terminal after closing in a section along line VII—VII of FIG. 8;

FIG. 8 is a section through line VIII—VIII of FIG. 7.

SPECIFIC EXAMPLES OF INVENTION

Referring now to FIGS. 1–5 of the drawings, the cable terminal 1 in accordance with the invention is in the shape of a hollow cylinder or cuboid, i.e. an annular cylinder which can also be oval instead of circular. The cable terminal 1 has two upwardly open grooves 2, 3 on two diametrically opposed sides for the insertion of a cable. A track 5, which essentially comprises two opposed guide rails 6, 7, is provided between these grooves 2, 3, offset at 90 degrees, on the inner periphery of the cable terminal. The track 5 is diametrically opposed by a flexible locking tooth 8 which is formed by the lower end of an inclined locking lever 9 moulded to the upper edge of the terminal carrier. The movability of the locking lever 9 is enhanced by lateral incisions 10 (cf. FIGS. 2 and 3).

On one of its arms, the track arm 13, the concomitant terminal clamp 12 has lateral rails or edges 14, 15 which fit exactly into the guide recesses behind each of the rails 6, 7 of the terminal carrier and are thereby tracked. The terminal clamp 12 can be connected to the terminal carrier 1 by means of a subsequently added strap 16 such that the two parts of the cable terminal can be handled as a single part. A mushroom-shaped cover section 18, at which the necessary force to clamp the cable can easily be applied manually without tools, extends at right angles to the track arm 13 of the terminal clamp.

A projecting rail, i.e. a clamping rib 19, is located below the cover 18 and centrally relative to the two edge recesses/ carrying ribs 2, 3 of the terminal carrier 1. The clamping rib 19 describes an arc, corresponding to the periphery of a cable which it is required to clamp, and then merges into a wedge-shaped clamping rib 20 beside the track arm. On the other side the terminal clamp 12 has a shoulder 22 in which teeth 24 which mesh with the locking tooth 8 on the terminal carrier are formed consecutively in the direction of insertion between lateral rails 23.

The cable 30 is laid in the grooves 2, 3 (see FIG. 3). Even the act of loosely attaching the terminal clamp ensures that the cable is provisionally held by the overlapping locking shoulder 22. In a special embodiment the two grooves are step-shaped as in FIG. 3 which generates a stronger clamping effect. To close the cable terminal the track arm 13 of the terminal clamp 12 is inserted into the track 5 of the terminal carrier 1, as a result of which the cable 30 is bent between the two grooves 2, 3 of the terminal carrier and the clamping rib 19 of the terminal clamp (see FIGS. 4 and 5). This bending action is the cause of the particularly secure strain relief which is achieved with a relatively small clamping force that can comfortably be applied at the relatively large cover section 18. Simultaneously the flexible terminal carrier locking tooth 8 engages a tooth 24 in the toothed rack of the terminal clamp 12; in FIG. 4 it is the third tooth. The locking tooth 8 can be accessed by a screwdriver from outside between the two rails 23 on the cover section, by which means the locking tooth can be pushed to one side to enable easy opening of the cable terminal. The strap 16 between the terminal carrier and terminal clamp is accommodated in a channel 5a created in the terminal carrier. The terminal carrier and terminal clamp can be injection-moulded as two separate parts.

The terminal carrier or socket is provided on its outer periphery with hooks or means of attachment with which it can engage a corresponding opening in an instrument wall. To this end, two ribs 25, 26 moulded on the outer periphery of the terminal carrier 1 lie flush with the upper edge of a socket opening in a wall 32. Between these are moulded two lower fixing ribs 27, 28 at a pitch corresponding to the wall thickness which engage the lower edge of the socket opening. Lateral slits 29 ensure the necessary flexibility for engaging the socket opening. These means of attachment can be easily moulded on by injection moulding during manufacture.

Referring now to FIGS. 6, 7, and 8, the embodiment illustrated therein corresponds in essence to that shown in FIGS. 1 to 5 though with the particular difference that the toothed rack or row of locking teeth 24 is not formed on a special shoulder but on the track arm 13a itself. Correspondingly, the locking lever 9a with the locking tooth 8 is formed on the same side as the track for the track arm 13a. This increases the clamping effect of the wedge-shaped area of the clamping rib.

While the upper arced area 19a of the clamping rib seeks to press the cable downwards, the wedge-shaped area 20a of the clamping rib acts at right angles to this wedge area; in practice this causes the clamped cable to bend in a particular direction. Thanks to the wedge effect of the clamping rib's wedge-shaped area the length of insertion is increased (as explained in the introduction), as a consequence of which more teeth can be formed on the track arm 13a which ensures a greater clamping area (for clamping cables of differing thickness).

I claim:

1. In a cable terminal which comprises a terminal carrier (1) and a terminal clamp (12) tracked in said carrier where a flexible locking tooth (8) on the terminal carrier (1) works in combination with a toothed rack (24) on the terminal clamp (12), the improvement wherein the upper edge of the terminal carrier (1) comprises two opposing grooves (2,3) to accommodate a cable, and the terminal clamp (12) comprises a clamping rib having an upper arced area (19a), and a wedge-shaped area (20a) which tapers off downwardly, acts on the cable centrally to the grooves, and can be axially displaced and locked; said cable terminal being further characterized in that said locking tooth (8) can be readily accessed so as to enable easy opening of the cable terminal.

2. The cable terminal of claim 1, further characterized in that ribs (25, 26, 27, 28) are provided on the outer periphery of the terminal carrier for attachment in a recess in a wall (32).

3. The cable terminal of claim 1, further characterized in that the toothed rack (24) is provided on a shoulder (22) located opposite a tracked arm (13) of the terminal clamp (12).

4. The cable terminal of claim 1, further characterized in that the toothed rack (24) is provided on a tracked arm (13a) of the terminal clamp.

5. The cable terminal of claim 1, further characterized in that the grooves (2,3) are step-shaped or notched.

* * * * *